United States Patent Office 3,384,213
Patented May 21, 1968

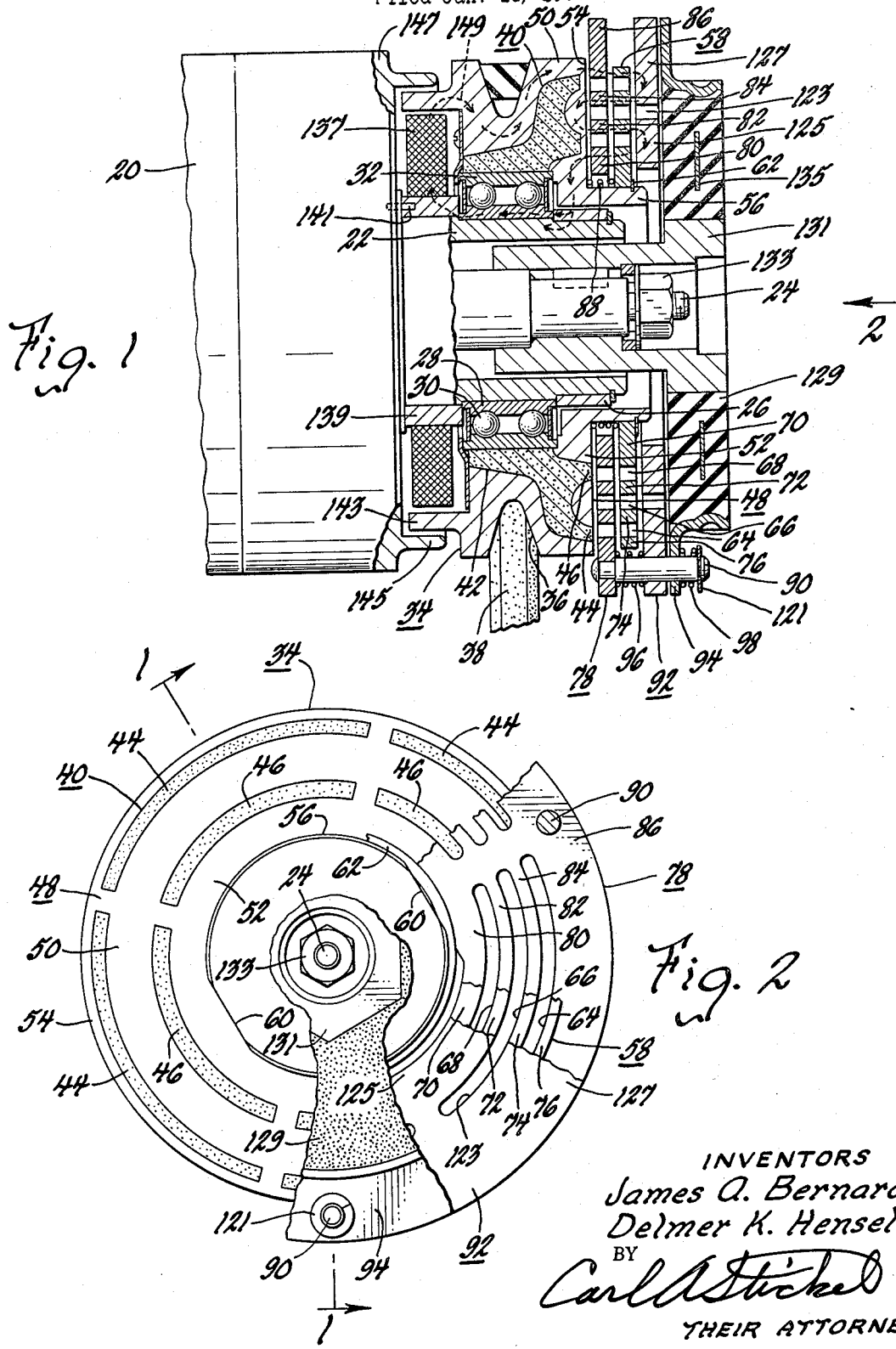

3,384,213
ELECTROMAGNETIC CLUTCH WITH CARBON CORE
James A. Bernard and Delmer K. Hensel, Dayton, Ohio, assignors to General Motors Corporation, Detroit, Mich., a corporation of Delaware
Filed Jan. 13, 1966, Ser. No. 520,428
8 Claims. (Cl. 192—84)

ABSTRACT OF THE DISCLOSURE

In the preferred form, the drive pulley is made of malleable iron which is cast around a carbon or ceramic core which separates the face co-operating with the armature into outer, inner and intermediate substantially annular poles. The drive pulley also supports an axially slidable armature plate having arcuate slots dividing it into four magnetic poles. A similar four pole armature plate is located between this first mentioned armature plate and the pulley. A third armature plate has a single annular series of slots to divide it into two annular poles and is located on the outside of the slidable armature plate. The last two armature plates are slidably pinned to a flange ring bonded to the outer portion of an elastomeric disc. The inner peripheral portion of this elastomeric disc is connected to the drive shaft. This disc serves both as a vibration absorber and a resilient axially movable mounting for the armature plates.

---

This invention relates to electromagnetic clutches such as may be used to drive the compressors of automotive air conditioning systems.

Although automobile air conditioners have become more popular, they remain relatively expensive. One of the more expensive parts of the automobile air conditioners is the electro-magnetic clutch employed to connect and disconnect the compressor to and from the automobile engine. The electro-magnetic clutches now being used have relatively high machining, processing and assembling costs.

It is an object of this invention to provide an electromagnetic clutch in which the machining costs are reduced and the parts, processing and assembling are simplified and reduced in costs.

It is another object of this invention to provide an electro-magnetic clutch in which the electro-magnet coil arrangement is simplified and the drive pulley is made in a single casting operation.

It is another object of this invention to provide an electro-magnetic clutch in which the armature means has an increased number of magnetic flux closing points so that a smaller, less expensive electromagnetic coil is sufficient to accomplish the clutching.

It is another object of this invention to provide an electro-magnetic clutch in which the very effective armature means includes a plurality of plates inexpensively punched to form a plurality of pole faces which are connected through a simple ring to the periphery of an axially and torsionally resilient elastomeric disc connected to the driven shaft for providing torrsional damping and also axial movement of the armature plates.

These and other objects are attained in the form shown in the drawings in which the drive pulley is cast of malleable iron with a carbon or ceramic core which separates its armature cooperating face into outer, inner and intermediate substantially annular poles. The drive pulley also serves to support an axially slideable armature plate having arcuate slots therein to divide it into four magnetic poles.

This armature plate rotates with the drive pulley but has slideable axial movement relative to it. A similar armature plate is located between the first mentioned armature plate and the armature attracting face of the pulley. A third armature plate has a single annular series of slots to divide it into two annular poles and is located on the outside of the first mentioned armature plate.

The last two armature plates are slideably pinned to a flanged ring which is bonded to the outer portion of an elastomeric disc. The inner portion of this elastomeric disc is bonded to a drive sleeve connecting with the drive shaft of the compressor. The compressor is provided with a fixed rigid metal cantilever sleeve surrounding the drive shaft and the aforementioned drive sleeve. This fixed sleeve supports the inner race of a ball bearing. The outer race of the ball bearing supports the drive pulley. A ribbon type of electromagnetic coil is mounted upon a ring which in turn is mounted upon the aforementioned cantilever sleeve in an efficient electromagnetic relation with the face of the drive pulley opposite its armature attracting face. When this coil is energized, the armature plates are attracted to the armature attracting face of the drive pulley through the series transmission of the electromagnetic flux through the armature plates and the armature attracting face of the drive pulley to cause the drive pulley to be clutched to the compressor shaft.

Further objects and advantages of the present invention will be apparent from the following description, reference being had to the accompanying drawings wherein preferred embodiments of the present invention are clearly shown.

In the drawings:

FIGURE 1 is a sectional view of an electromagnetic clutch mounted upon a refrigeration compressor of the automotive type taken substantially along the line 1—1 of FIGURE 2; and, FIGURE 2 is an end view of FIGURE 1 with selected portions of the plates and parts broken away to show the various features of the parts.

Referring now to the drawings, there is illustrated an automobile air conditioning compressor 20 having an integral fixed cantilever sleeve 22 extending from one end surrounding its drive shaft 24. According to my invention, mounted upon and fixed to this sleeve 22 by a ring 26 and an adjacent locking ring is the inner race 28 of a ball bearing 30 having its outer race 32 fixed within the drive pulley 34 having a pulley groove 36 for receiving the drive belt 38 from the automobile engine. This drive pulley is cast with a core 40 of carbon having an inner portion 42 within which is mounted the outer race 32. The carbon core or ceramic 40 also has two projecting portions 44 and 46 in the form of four arcuate segments, each extending to the face 48 of the pulley 34 so as to surround substantially an interpole ring 50 as well as forming an inner ring 52 and an outer ring 54 forming inner and outer annular magetic poles. The pulley has a forwardly extending inner flange 56 of malleable iron surrounding the sleeve 22 and the ring 26 having slideably but non-rotatably mounted thereon a middle armature plate 58. To provide this slidable, non-rotatable mounting, the flange 56 is provided with flats 60 cooperating with a complementary flat sided aperture in the middle armature plate 58 to prevent relative rotation and yet permit axial movement. The weak coil spring 88 lightly urges outwardly the middle armature plate 58 away from the pulley 34 into engagement with a stop ring 62 mounted on the outer end of the flange 56. The middle armature plate 58 has three concentric ring-shaped arrangements of punched slots designated as 64, 66 and 68, forming an inner magnetic circle or ring 70, inner and outer intermediate magnetic circles or rings 72 and 74, and an outer magnetic circle or ring 76.

This middle armature plate 58 as well as the other armature plates may be punched out of any suitable paramagnetic material such as low carbon steel. The second armature plate 78 is similarly punched with three concentric circular arrangements of arcuate slots to form an inner magnetic ring 80, an inner intermediate magnetic ring 82, an outer intermediate magnetic ring 84 and an outer magnetic ring 86. The interior of this second plate 78 has an inner arperture punched larger than the inner aperture of the middle armature plate 58. It surrounds the small coil spring 88. The second armature plate is riveted to the inner end of the three pins 90, located 120° apart which slide through apertures in the third armature plate 92 and a flanged ring 94. The pins 90 are each provided with a small coil spring 96 between the armature plates 78 and 92 as well as a small coil spring 98 between the flanged ring 94 and a washer 121 which is locked on the outer end of each of the pins 90. These springs 88, 96 and 98 serve to keep the armature plates 78, 58 and 92 as well as the pulley 34 and the ring 94 separated from each other when there is substantially no magnetic attraction. This prevents drag when the clutch is de-clutched.

The flange ring 94 has a radial flange transverse to the pins 90 and parallel to the third armature plate 92. The armature plate 92 has a single circular arrangement of arcuate slots 123 separating the inner and outer magnetic poles 125 and 127. The flanged ring 94 is made axially movable by being bonded to the outer rim of an elastomeric disc 129 which has its inner periphery mounted upon the hexagonal or knurled surfaces upon the outer end of the sleeve 131. This sleeve 131 is mounted upon and keyed to the drive shaft 24 of the compressor 20. It is locked in place by the nut 133 provided on the outer end of the shaft 24. The axial resiliency of the disc 129 may be reduced by molding therein a thin spring metal ring 135. The disc 129 also absorbs torsional vibrations in addition to providing an axially movable mounting for the ring 94 and serving as the driving connection between the ring 94 and the sleeve 131.

The clutch is engaged by the energization of an inexpensive ribbon type of electro-magnetic coil 137 which may be formed of a thin ribbon of insulated anodized aluminum strip which is spirally wound on the steel ring 139 which is mounted upon the inner portion of the sleeve 22 and locked to the compressor 22 by a locking pin 141. The coil 137 is locked inside of a horizontal angular integral flange 143 extending toward the compressor 20 from the malleable iron portion of the pulley 34. This horizontal flange 143 rests within a horizontal angular flange 145 extending in the opposite direction from the adjacent end wall 147 of the compressor 20 which is preferably made of paramagnetic metal such as malleable iron so as to improve the magnetic flux creating characteristics of the coil 137. The energization of the coil 137 causes the magnetic flux to transverse a path through the paramagnetic materials as indicated by the dotted arrows 149.

This flux crosses the gap from the coil 137 to the horizontal flange 143 and flows through the outer magnetic pole portion of the pulley 34 surrounding the carbon portion 40 extending around the pulley groove 36 to the outer pole 54. The flux thence crosses the gap and flows through the outer pole 86 of the second armature plate 78 and across the gap to the outer pole 76 of the middle armature plate 58 and across the gap to the outer pole 127 of the third armature plate 92 thence reverses through the outer intermediate poles 74 and 84 of the middle and second armature plates 58 and 78 to the inner pole 50 from which the flux reverses again through the inner intermediate poles 82 and 72 of the second and middle armature plates 78 and 58 and through the inner pole 125 of the third armature plate 92 and reverses again through the inner armature poles 70 and 80 to the flange 56 from which the flux is conducted adjacent portions of the ring 26 and through the inner race 28 of the ball bearing 30 and the sleeve 22 to the steel ring 139 on the inside of the coil 137.

This provides an inexpensive multiple disc armature plate arrangement providing twelve magnetic crossing points where the magnetic flux crosses the gaps between the pulley 34 and the discs 78, 58 and 92 providing a strong magnetic attraction which draws the discs 78, 58 and 92 as well as the ring 94 toward the pulley 34 so that all are held magnetically in face to face engagement with each other to clutch the pulley 34 to the drive shaft 24 through the resilient elastomeric disc 129 which absorbs torsional vibrations to prevent undue stress upon the shaft 24. The disc 129 provides sufficient resiliency between its inner portion mounted on the sleeve 131 and its outer portion which is bonded to the ring 94 to prevent any binding and correct misalignment to permit the free axial movement necessary in order that the plates 92 and 78 will firmly clamp the middle armature plate 58 between them and also to permit the armature plate 78 to be firmly in contact with the adjacent face of the pulley 34. The spring 98 also yields in providing for the desired axial movement of the armature plates.

Since the entire pulley can be readily cast by the use of an annular carbon or ceramic core of the configuration shown to provide an annular interpole along with inner and outer poles at a relatively low cost and since the armature plates are readily punched from inexpensive metal to provide a large number of magnetic flux crossing points in cooperation with the cast pulley, a less expensive electromagnetic coil can be used while maintaining improved magnetic attraction for clutching, Through the use of all these cost saving features, the cost of the clutch is considerably reduced while the desired performance is improved.

While the embodiments of the present invention as herein disclosed, constitute preferred forms, it is to be understood that other forms might be adopted.

What is claimed is as follows:

1. An electromagnetic clutch including a shaft, a rotatable means rotatably mounted relative to said shaft comprising an iron casting cast around a non-magnetic ring intermediate the inner and outer portions and substantially magnetically separating the inner and outer portions, armature means connected to said shaft cooperating with said rotatable means, and an electromagnet coil magnetically associated with said rotatable means for attracting said armature means.

2. A clutch as defined in claim 1 in which said inner and outer portions form inner and outer pole faces and in which said iron casting has intermediate arcuate portions cast onto said non-magnetic ring forming an intermediate pole face in between said inner and outer pole faces, said non-magnetic ring extending between and substantially magnetically separating said arcuate portions and said intermediate pole face from said inner and outer portions and said inner and outer pole faces.

3. A clutch as defined in claim 1 in which said inner and outer portions form inner and outer pole faces and in which said non-magnetic ring has an annular groove with widely spaced notches along its edges, said groove being intermediate said pole faces, said iron casting having integral cast portions extending through said notches and filling said annular groove to form an intermediate pole face.

4. A clutch as defined in claim 1 in which said inner and outer portions form inner and outer pole faces and in which said non-magnetic ring being composed substantially of carbon.

5. An electromagnetic clutch including a shaft, an elastomeric member having an inner portion connected to said shaft, armature means mounted upon and connected to an axially movable outer peripheral surface portion of said elastomeric member, a rotatable paramagnetic means rotatably mounted relative to said shaft adjacent said armature means, and an electromagnet coil magnetically associated with said rotatable means and said armature means for attracting said armature means to said rotatable means and moving axially said armature means relative to said inner portion.

6. A clutch as set forth in claim 5 in which a thin resilient metal disc is embedded within said elastomeric member.

7. An electromagnetic clutch including a shaft, an elastomeric disc having an inner aperture with only its inner endless surface connected to said shaft, armature means mounted upon and connected only to an axially movable outer peripheral surface of said elastomeric disc, a rotatable paramagnetic means rotatably mounted relative to said shaft adjacent said armature means, and an electromagnetic coil magnetically associated with said rotatable means and said armature means for attracting said armature means to said rotatable means and moving said armature means relative to said inner aperture.

8. An electromagnetic clutch including a shaft, rotatable paramagnetic means rotatably mounted relative to and coaxially with said shaft, said rotatable means having three substantially annular pole faces, armature means comprising a first armature member connected to said rotatable means and a second armature member located between said first armature member and said armature pole faces of said rotatable means and a third armature member located on the opposite side of said first armature member, said face and said armature members being provided with four substantially annular pole faces and said third armature member being provided with two substantially annular pole faces located to bridge the two outer and the two inner pole faces respectively of said first and second armature members, said second and third armature members being connected to said shaft, and an electromagnetic coil associated with said rotatable means for attracting said armature means.

References Cited
UNITED STATES PATENTS

| | | | |
|---|---|---|---|
| 2,267,114 | 12/1941 | Lear et al. | 192—84 X |
| 2,698,679 | 1/1955 | Vernhes | 192—84 |
| 2,796,963 | 6/1957 | Harter | 192—84 |
| 2,860,403 | 11/1958 | Meyer | 192—84 |
| 2,919,777 | 1/1960 | Walter | 192—84 |
| 2,950,795 | 8/1960 | Fischer | 192—84 X |
| 3,016,580 | 1/1962 | Jaeschke | 192—84 X |
| 3,036,679 | 5/1962 | Millington et al. | 192—84 |
| 3,055,475 | 9/1962 | Pitts | 192—84 |
| 3,092,307 | 6/1963 | Heidorn. | |
| 3,205,989 | 9/1965 | Mantey | 192—84 |

DONLEY J. STOCKING, *Primary Examiner.*

ARTHUR T. McKEON, *Examiner.*

UNITED STATES PATENT OFFICE
CERTIFICATE OF CORRECTION

Patent No. 3,384,213 May 21, 1968

James A. Bernard et al.

It is certified that error appears in the above identified patent and that said Letters Patent are hereby corrected as shown below:

Column 1, line 61, "torrsional" should read -- torsional --. Column 2, line 54, "magetic" should read -- magnetic --. Column 3, line 7, "arperture" should read -- aperture --; line 16, after "on" insert -- to --; line 45, "locked" should read -- located --. Column 4, line 51, "onto" should read -- into --.

Signed and sealed this 11th day of November 1969.

(SEAL)
Attest:

Edward M. Fletcher, Jr.
Attesting Officer

WILLIAM E. SCHUYLER, JR.
Commissioner of Patents